March 7, 1967  F. FAULHABER ETAL  3,308,319
MINIATURE ELECTRIC MOTOR
Filed July 7, 1964

Inventors
Fritz Faulhaber
Hans W. Hefter
by Singer, Stern & Carlberg
Attorneys

3,308,319
MINIATURE ELECTRIC MOTOR

Fritz Faulhaber, Wurttemberg, Germany, and Hans W. Hefter, Wilmette, Ill., assignors, by direct and mesne assignments, to Hans Stussi, Cassarate, near Lugano, Ticino, Switzerland
Filed July 7, 1964, Ser. No. 380,868
9 Claims. (Cl. 310—154)

The invention relates to miniature electric motors of the type in which a rotor provided with a hollow cylindrical armature winding rotates about a stationary unwound cylindrical permanent magnet.

It is an object of the invention to provide an electric motor of this type in which the shaft on which the rotor is fixedly mounted is rotatably supported in said stationary permanent magnet and extends entirely through the same. The permanent magnet is fixedly mounted independently of the rotor shaft by means of an annular supporting member in a housing of magnetizable material. This housing has an inner cylindrical wall which concentrically surrounds said stationary permanent magnet in radially spaced relation, so that an annular air gap is formed between said housing and the outer circumference of the cylindrical permanent magnet. In the assembled motor the hollow cylindrical armature winding of the rotor extends freely rotatably into said annular air gap and into the magnetic field traversing the same, so that upon energization of said armature winding the rotor is rotated.

Another object of the invention is to form a unitary subassembly of an electric motor comprising a cylindrical housing of magnetizable material, to one end of which is attached a cylindrical permanent magnet which extends axially into one end of said housing. This permanent magnet is concentrically surrounded by the housing in radially spaced relation to form an annular air gap between the circumference of the magnet and the inner wall of the housing, and the permanent magnet is provided with an axial bore extending completely through the same and with bearing means in said bore for rotatably supporting the shaft of a rotor which is adapted to be inserted into said bore from one end of said housing for freely and solely rotatably supporting said rotor shaft in the other end of said subassembly. Said rotor shaft extends entirely through the subassembly.

The rotor comprises another subassembly formed of an armature winding in the shape of a hollow cylindrical body, one end of which is attached by a circular disc to a shaft, while the other end of the hollow cylindrical body is open and upon axially inserting said shaft into the bearing means arranged in the permanent magnet from the other end of the housing enters said annular air gap in the first mentioned subassembly to be rotatable therein.

Still another object of the invention is to provide an electric motor which may easily be assembled by slidably uniting two subassemblies which are adapted to be economically manufactured in large quantities with uniform quality and accuracy and of uniform performance.

These and other objects and advantages of the invention will become apparent from the detailed description which follows when taken in conjunction with the accompanying drawings in which FIG. 1 is an axial sectional view of one subassembly of the electric motor comprising the housing and the central permanent magnet therein;

Figure 1:
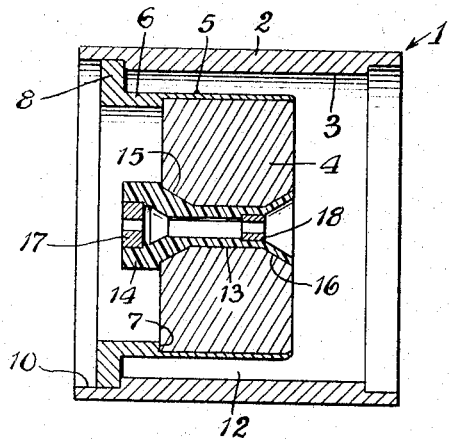
Figure 2:
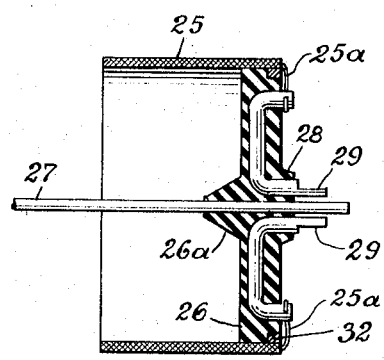
FIG. 2 is an axial sectional view of another subassembly comprising the rotor armature winding, the rotor shaft and the commutator.

Referring to the drawing, the electric motor 1 comprises a substantially cylindrical housing 2 of magnetizable material and having an inner cylindrical wall 3 which in radially spaced relation surrounds concentrically a cylindrical stationary permanent magnet 4. The magnet 4 is fixedly mounted in a thin-walled sleeve 5 of non-magnetizable material. This sleeve 5 has one of its ends reinforced at 6 to form an annular abutment shoulder 7 for one end of the permanent magnet 4. The reinforced end of the sleeve 5 is provided with an outwardly extending flange 8 whose outer edge rests in an annular groove 10 formed in one end of the housing 2, thereby supporting the permanent magnet 4 axially within the housing and forming an annular air gap 12 between the magnet 4, or more accurately, between the outer surface of the thin-walled sleeve 5 and the inner wall 3 of the housing 2. The annular air gap 12 is closed at one end by the flange 8 of the sleeve 5.

Figure 3:
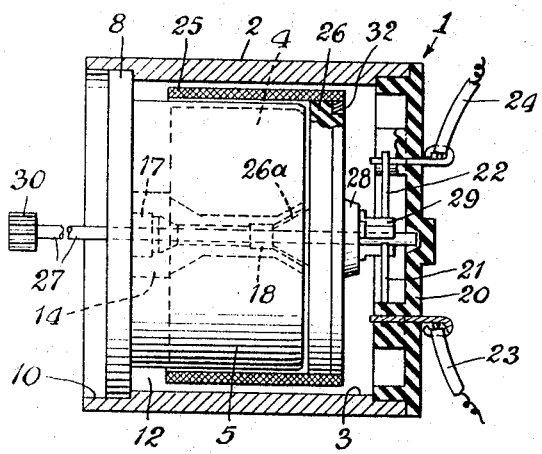
FIG. 3 is an axial section of the completely assembled electric motor.
Figure 4:
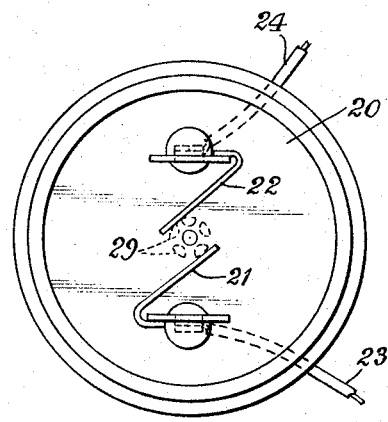
FIG. 4 is an end view of the removable circular end wall of the housing at the commutator end of the electric motor.

An axial bore 13 extends entirely through the permanent magnet 4 and has fixedly mounted therein a non-magnetizable tubular body 14, preferably made of a synthetic resin, with conically expanded end portions 15 and 16 which in turn have mounted therein metallic bearing bushings 17 and 18 to form axially spaced bearings for a rotor shaft 27 to be described presently in connection with the detailed description of the rotor. The other end of the housing, as shown in FIG. 3 in the assembled condition of the electric motor, is closed by a removable circular end wall 20 of insulating material which on its inner face carries the yieldable contact brushes 21 and 22, having portions extending through the wall 20 and connected to conductor wires 23 and 24, respectively. The center of the wall may be constructed to form a bearing for an outwardly projecting end of the rotor shaft.

The rotor is formed by an armature winding 25 wound in a hollow cylindrical shape and saturated with a suitable lacquer to make it solid and retain its form. It will be noted that the armature does not contain any iron or other metal. One end of this hollow cylindrical armature winding 25 is attached to the circumference of a circular disc 26 of insulating material which is fixedly attached to a shaft 27. Preferably, the outer edge of the disc 26 is provided with a circular groove filled with an adhesive lacquer 32 which also saturates the winding 25 and holds the same in position on the disc 26. This disc 26 is integrally formed with a commutator body 28 whose conductive elements 29 are connected to taps 25a of the rotor winding 25. Preferably, the commutator 28, 29 is constructed in a manner as disclosed in the United States Letters Patent No. 2,999,956 of Sept. 12, 1961.

The armature winding 25 may be constructed in any desired conventional manner, but for the purpose of highest efficiency and the development of a good torque, it is preferred to employ a two layer wave winding with obliquely disposed conductors as disclosed in the German periodical VDI Nachrichten of January 10, 1962.

The assembly of the electric motor is extremely simple. The rotor shaft 27 with the hollow cylindrical winding 25, disc 26 and commutator 27, 28 thereon is axially inserted into the axially aligned bearing bushings 17, 18 in the permanent magnet 4 until a central projection 26a on the disc 26 engages the bushing 18. In this position the armature winding 25 surrounds loosely rotatably the stationary cylindrical permanent magnet 4. Thereupon the circular end wall 20 with the contact brushes 21 and 22 is attached to the housing 2, whereby the brushes 21, 22 will automatically engage the circumference of the commutator 28, 29. The end of the rotor shaft 27 projecting from the bearing bushing 17 may be provided with a drive pinion 30 as shown, and the electric motor is now ready for operation.

What we claim is:

1. An electric motor comprising a housing provided with a cylindrical inner wall, a cylindrical permanent magnet arranged in said housing concentrically with respect to said cylindrical inner wall so as to form an annular sleeve air gap, annular means in which said permanent magnet is mounted for supporting the latter in said concentric position with respect to said inner wall; said sleeve means being supported in said housing at one end thereof, a rotor comprising a hollow cylindrical armature winding, a disc attached to one end of said hollow cylindrical winding, and a rotor shaft to which said disc is fixedly attached; said hollow cylindrical armature winding extending with its other end into said annular air gap to surround the entire permanent magnet and said rotor shaft extending axially completely through said permanent magnet, said permanent magnet being provided with a central opening with bearing means mounted within said opening for rotatably supporting said rotor shaft, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

2. An electric motor comprising a housing provided with a cylindrical inner wall, a cylindrical permanent magnet arranged in said housing concentrically with respect to said cylindrical inner wall so as to form an annular sleeve air gap, annular means in which said permanent magnet is mounted for supporting the latter in said concentric position with respect to said inner wall and closing one end of said annular air gap; said annular means comprising a thin-walled sleeve of non-magnetic material which is attached to the circumference of said cylindrical magnet and extends the entire length thereof, one end of said sleeve being provided with an outwardly extending flange which is slidably attached to said one end of said housing, a rotor comprising a hollow cylindrical armature winding, a disc attached to one end of said hollow cylindrical winding, and a rotor shaft to which said disc is fixedly attached; said hollow cylindrical armature winding extending with its other end into said annular air gap to surround said permanent magnet and said sleeve thereon, and said rotor shaft extending axially completely through said permanent magnet, said permanent magnet being provided with a central opening, and bearing means mounted within said opening for rotatably supporting said rotor shaft, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

3. A subassembly for an electric motor comprising a housing provided with an inner cylindrical wall and a cylindrical permanent magnet arranged in axial alignment with said inner cylindrical wall so as to form an annular air gap within said housing, annular sleeve means surrounding the length of said permanent magnet made of non-magnetic material in which said permanent magnet is mounted, said sleeve means being adapted to be inserted in said housing and connected to one end of said housing for supporting the permanent magnet concentrically within said inner cylindrical wall, said permanent magnet being provided with a central opening, bearing means mounted axially and entirely within said opening of said cylindrical permanent magnet adapted to rotatably support a rotor shaft therein, said means being independent and separate of said annular sleeve means and comprising a sleeve of plastic material mounted in the opening of said permanent magnet and two axially spaced metallic bearing bushings therein, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

4. An electric motor comprising a substantially cylindrical housing provided with a cylindrical inner wall, a cylindrical permanent magnet having an axial bore extending therethrough and arranged concentrically within said cylindrical housing so as to form an annular air gap between said permanent magnet and said cylindrical inner wall, annular sleeve means attached to one end of said cylindrical housing and in which said permanent magnet is mounted for supporting the latter in said concentric position within said housing; a rotor comprising a hollow cylindrical armature winding, a disc attached to one end of said hollow cylindrical winding, and a rotor shaft to which said disc is fixedly attached; said hollow cylindrical armature winding extending freely rotatably into said annular air gap, and said rotor shaft extending axially through said axial bore of said permanent magnet, said axial bore extending through said permanent magnet being provided with bearing means therein for rotatably supporting said rotor shaft, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

5. An electric motor comprising a substantially cylindrical housing provided with a cylindrical inner wall, a cylindrical permanent magnet arranged concentrically within said cylindrical housing so as to form an annular air gap between said permanent magnet and said cylindrical inner wall, annular means attached to one end of said cylindrical housing and said permanent magnet for supporting the latter in said concentric position within said housing; said annular means comprising a thin-walled sleeve of non-magnetic material which is attached to the circumference of said cylindrical magnet, one end of said sleeve being provided with an outwardly extending flange which is slidably attached to said one end of said housing, a rotor comprising a hollow cylindrical armature winding, a disc attached to one end of said hollow cylindrical winding, and a rotor shaft to which said disc is fixedly attached; said hollow cylindrical armature winding extending into said annular air gap, and said rotor shaft extending axially completely through said permanent magnet, said permanent magnet being provided with a central opening and bearing means mounted within said opening for rotatably supporting said rotor shaft, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

6. A subassembly for an electric motor comprising a housing provided with an inner cylindrical wall and a cylindrical permanent magnet arranged in axial alignment with said inner cylindrical wall so as to form an annular air gap within said housing, and annular means attached to one end of said housing and to the circumference of said permanent magnet for supporting the latter concentrically within said inner cylindrical wall, said cylindrical permanent magnet being provided with an axial bore extending completely through the same, and bearing means within said bore independent of said annular means for rotatably supporting a rotor and rotor shaft axially inserted within said cylindrical permanent magnet, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

7. A subassembly for an electric motor comprising a substantially cylindrical housing provided with an inner cylindrical wall and a cylindrical permanent magnet arranged in axial alignment with said inner cylindrical wall so as to form an annular air gap within said housing, and annular means inserted in and attached to one end of said housing and to said permanent magnet for supporting the latter concentrically within said inner cylindrical wall, said cylindrical permanent magnet being provided with bearing means independent of said annular means for rotatably supporting a rotor shaft axially within said cylindrical permanent magnet inserted from the opposite end of said housing, said annular means comprising a thin-walled sleeve of non-magnetic material which is attached to the circumference of said cylindrical magnet, one end of said sleeve being provided with an outwardly extending flange which is inserted in and attached to the other end of said housing, said bearing means being the sole support of said rotor, said permanent magnet and sleeve means forming a first subassembly and said rotor and shaft forming a second subassembly adapted to be easily assembled to form an electric motor my simply inserting each subassembly into opposite ends of said housing with the shaft inserted in said magnet.

8. An electric motor comprising a substantially cylindrical housing provided with a cylindrical inner wall, a cylindrical permanent magnet arranged concentrically within said cylindrical housing so as to form an annular air gap between said permanent magnet and said cylindrical inner wall, sleeve means inserted in and connected to one end of said cylindrical housing with its major portion surrounding said permanent magnet for supporting the latter in said concentric position within said housing, a rotor comprising a hollow cylindrical armature winding extending freely rotatably into said annular air gap, a rotor shaft fixedly connected to one end of said hollow cylindrical winding and axially extending completely through said cylindrical permanent magnet, said rotor shaft being assembled from the other end of said housing, the permanent magnet being provided with a central opening, bearing means within said opening for rotatably supporting said rotor shaft at axially spaced portions, said bearing means being separate from said means attached to said housing for easy assembly and supporting said permanent magnet, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

9. An electric motor comprising a substantially cylindrical housing provided with a cylindrical inner wall, a cylindrical permanent magnet having a central opening arranged concentrically within said cylindrical housing so as to form an annular air gap between said permanent magnet and said cylindrical inner wall, means adapted to be inserted in said housing through one end thereof and attatched to one end of said cylindrical housing and said permanent magnet for supporting the latter in said concentric position within said housing, a rotor adapted to be inserted in the other end of said housing and comprising a hollow cylindrical armature winding extending freely rotatably into said annular air gap, a rotor shaft fixedly connected to one end of said hollow cylindrical winding and axially extending completely through said cylindrical permanent magnet, bearing means mounted within the opening of said magnet for rotatably supporting said rotor shaft at axially spaced portions, said bearing means being separate from said means attached to said housing for supporting said permanent magnet, said permanent magnet supporting means comprising a thin-walled sleeve of non-magnetic material which is attached to the circumference of said cylindrical magnet, one end of said sleeve being provided with an outwardly extending flange which is attached to said one end of said housing, said bearing means being the sole support of said rotor, said permanent magnet and sleeve means forming a first subassembly and said rotor and shaft forming a second subassembly adapted to be easily assembled to form an electric motor by simply inserting each subassembly into opposite ends of said housing with the shaft inserted in said magnet.

References Cited by the Examiner

FOREIGN PATENTS 951,229   3/1964   Great Britain.

MILTON O. HIRSHFIELD, *Primary Examiner.*

L. L. SMITH, *Assistant Examiner.*